July 24, 1962 K. WIEHL 3,046,361
ELECTROACOUSTIC TRANSDUCER
Filed Sept. 8, 1959 2 Sheets-Sheet 1

July 24, 1962 K. WIEHL 3,046,361
ELECTROACOUSTIC TRANSDUCER
Filed Sept. 8, 1959 2 Sheets-Sheet 2

United States Patent Office 3,046,361
Patented July 24, 1962

3,046,361
ELECTROACOUSTIC TRANSDUCER
Klemens Wiehl, near Erlangen, Germany, assignor to Siemens-Schuckertwerke Aktiengesellschaft, Berlin-Siemensstadt and Erlangen, Germany, a corporation of Germany
Filed Sept. 8, 1959, Ser. No. 838,735
Claims priority, application Germany Sept. 9, 1958
7 Claims. (Cl. 179—100.41)

My invention relates to microphones, phonograph pickups, and similar electroacoustic transducers for translating mechanical vibrations, particularly oscillations in the sonic, infra-sonic, and ultra-sonic frequency ranges, into electrical voltages or currents.

It is among the objects of my invention to devise an electroacoustic transducer that combines the reliability and durability of an electromagnetic system with increased output voltage and output power.

Another object of my invention is to devise an electroacoustic transducer, particularly suitable for direct connection to a transistor amplifier, that requires at least one amplifying stage less than the known transducers of comparable frequency characteristics.

According to my invention I provide an electroacoustic transducer with magnetic field means having an inhomogeneous field, and subject to that field a Hall-voltage generating semiconductor plate, or a plurality of such plates; I further subject either the magnetic field means or the Hall plate to oscillatory motion in response to those to be translated into an electric magnitude, the latter magnitude then appearing as the output voltage of the Hall plate.

According to a more specific feature of my invention, a microphone is obtained by mounting a Hall plate on a diaphragm so that the plate participates in the sonically responsive oscillations of the diaphragm. Analogously, for providing a pickup for record discs, magnetic sound tapes or the like, one or more Hall plates are mounted on the carrier of the pickup stylus, for example on the pin to which the sapphire, diamond or other stylus is attached. The Hall plate or plates then move between the pole faces of an inhomogeneous magnetic field in accordance with the deflections of the stylus. In such microphones and pickups, the output voltage of the Hall plate, appearing across its two Hall electrodes, is proportional to the deflection and hence to the amplitudes of the sonic frequency being sensed.

The magnetic field in whose inhomogeneous portion the Hall plate is located may be produced electrically or by a permanent magnet. The Hall plate is excited by passing through it a control current. When using direct current for this purpose, the voltage appearing between the two Hall electrodes, spaced from each other on the semiconducting Hall plate in a direction at a right angle to the flow of the excitation current, constitutes a direct voltage upon which an alternating voltage is superimposed, whereby the output voltage is modulated in accordance with the acoustic signal. By suitable filters, the direct voltage component can be eliminated so that the resulting output voltage is alternating and can be applied to an amplifier.

The alternating output voltage thus obtainable from the transducer, as a rule, is so large that, in comparison with other electromagnetic transducers, one amplifying stage can be dispensed with. The frequency characteristic, as a rule, is only determined by the natural or inherent frequency of the diaphragm or stylus mounting to which the movable member of the transducer unit, either the magnet or the Hall plate, is secured. The Hall plate itself can be given sufficiently small dimensions to make its oscillating mass negligible within the sonic frequency range to be covered. That is, the mass of the Hall plate can be kept so small that it does not appreciably impede or otherwise affect the oscillations and frequency behavior of the diaphragm or stylus assembly.

In conjunction with the relatively high voltage of a transducer according to the invention, the semiconducting Hall plates particularly suitable for such purposes and described below, have a low internal resistance so that the available power output is relatively high. As a result, such a transducer is particularly well suited for direct connection to a transistor amplifier. Transistor amplifiers are often preferred for use with record players, particularly in portable instruments, but since such amplifiers are essentially current amplifiers, they are not well suitable in conjunction with the high-quality magnetic-type pickups heretofore available unless a sufficient number of amplifying stages, including a pre-amplifier, are used. A transducer according to the invention, however, permits a full-range control of a transistor amplifier directly by the pickup voltage so that at least one amplifying stage can be eliminated. In this respect the low internal resistance facilitates proper impedance matching.

Suitable materials for the Hall plate in a transducer according to the invention are particularly the semiconducting compounds of the $A^{III}B^V$ type, consisting of a binary compound of an element from the third group with an element from the fifth group of the periodic system. Preferably applicable among the available $A^{III}B^V$ substances are indium arsenide (InAs) and indium antimonide (InSb).

As a rule, it is of advantage to give the magnetic field system two mutually opposed pole shoes in whose intermediate field gap the Hall plate is located, and to have the two pole shoes tapering or pointed toward each other and toward the Hall plate.

The movable mounting of the Hall plate, inclusive of the stylus of a phonograph pickup, need not differ from any of the conventional mountings. A Hall-voltage pickup according to the invention is suitable for lateral-type as well as depth-type grooved records. In analogy to the known sterophonic pickups, the invention is also applicable, essentially in the known manner, for the reproduction of two sound tracks displaced 90° from each other within a single groove and formed either as a combined lateral-and-depth record or as a symmetrical 45°-type recording. The efficiency of the novel transducer, is approximately one decimal order of magnitude greater than that of comparable crystal systems. The simultaneous use of two or more Hall plates, however, is significant not only for stereophonic or other multiple-channel reproductions, but can also be used for the purposes of use with a pull-push electric network.

As mentioned, the control current passing through the Hall plate during its operation may consist of direct current. However, alternating current is also applicable, particularly a current whose frequency is above the audible range. The output voltage of the Hall transducer then constitutes a modulated high-frequency voltage which can be amplified in a high-frequency amplifier and can be rectified ahead of, or behind, the final amplifier stage.

According to a further feature of my invention, the Hall plate, instead of being movable within a stationary magnetic field, is fixedly mounted between two limbs or yoke pieces of soft iron or other magnetizable high-permeability material, whereas the magnetic field is movable in response to the sonic oscillations. In such a design, a small permanent magnet constitutes the movable component to produce the necessary magnetic field. The permanent magnet may be mounted on the diaphragm or stylus assembly of the transducer. Such a permanent magnet, due to the high sensitivity of the Hall-voltage generator, need only be very small and light in weight so that it does not appreciably affect the oscillation properties of its carrier.

For example, in a microphone the diaphragm itself may be coated with a magnetic coating similar to the coating used on conventional sound-recording tape, so that an acoustically favorable shape of the diaphragm is afforded and its acoustic properties are not impaired by the magnet. Depending upon the amplitude of the oscillating diaphragm, the magnetizable yoke material surrounding the semiconducting Hall plate has the effect of more or less bunching the magnetic flux passing from the permanent magnet through the Hall plate.

The foregoing and other features of my invention will be further described with reference to the drawing showing, by way of example, a number of transducers according to the invention, partly in schematical and simplified representation.

Figure 1:
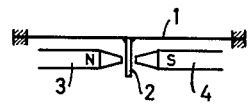
FIGS. 1 and 2 illustrate schematically two microphones.

According to FIG. 1, a diaphragm 1 of circular shape firmly clamped along its periphery carries in its center portion a Hall plate 2 located in the magnetic field between the pole shoes 3, 4 of a permanent magnet or electromagnet. The tips of the pole shoes are slightly tapering toward the plate 2 to produce a concentrated, inhomogeneous field. The acoustic signals impinging upon the diaphragm 1 cause the Hall plate to accordingly oscillate in the inhomogeneous field, thus converting the oscillating motion into electric voltage. The term "inhomogeneous" as used in this disclosure, signifies that the magnetic field is inhomogeneous with respect to the Hall plate or the path of motion traversed by the plate during its oscillations, so that the motion of the Hall plate in response to sonic vibration will cause the magnetic field to change its effect upon the voltage generated between the Hall electrodes of the plate 2. For this purpose, the area of the pole faces is smaller than the area of the Hall plate, preferably less than one-half of the plate area, thus providing a concentrated field of great inhomogeneity relative to the distribution of the magnetic flux passing through the plate.

Figure 8:
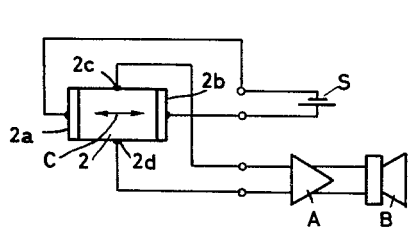
FIG. 8 is a schematic circuit diagram generally applicable to transducers as illustrated in the preceding figures.

An example of an electric circuit connected to the Hall plate by flexible leads is illustrated in FIG. 8, the same circuit diagram being applicable to most of the embodiments described hereinafter, except that in some of them the Hall plate and its leads are fixed, as will be more fully described below.

According to FIG. 8 the Hall plate 2 of semiconducting material, preferably indium antimonide or indium arsenide, has two metal terminals 2a and 2b to which a suitable current source, here shown as a direct-current source S, is attached, thus passing through the Hall plate an energizing current when the transducer is in operative condition. The Hall plate 2, consisting of a thin wafer or simply of a coating of semiconducting material, is provided with two probe electrodes 2c and 2d of metal located halfway between the terminals 2a, 2b and spaced from each other in a direction perpendicular to the flow direction of the energizing current. When no magnetic field is effective in a direction perpendicular to the plane of the Hall plate, Hall electrodes 2c and 2d are located on equipotential points so that there is no output voltage. When the magnetic field is effective, it causes a voltage to appear between electrodes 2c and 2d, and this voltage varies with positional variations of the magnetic field. The output voltage is applied to an amplifier A, preferably a transistor amplifier, and is shown to be used for operating a loudspeaker B.

Figure 2:
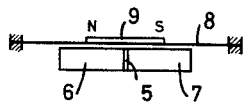

In FIG. 8 the direction of motion of the Hall plate relative to the pole shoes is indicated by a double-headed arrow C; but the moving direction may also have a different orientation in the plane of the plate. In the microphone shown in FIG. 2, the Hall plate 5 is stationarily mounted between two soft-iron limbs or yoke pieces 6 and 7. If desired, the two limbs 6 and 7 may also consist of ferrite. They form between each other a substantially planar, narrow gap in which the semiconducting Hall plate 5 is located in face-to-face relation to the surfaces of the limbs. The diaphragm 8 of the microphone carries a small permanent magnet 9 which, as mentioned above, may simply consist of a magnetized coating on the diaphragm 8.

Figure 3:
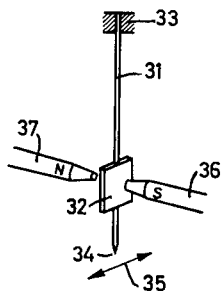
FIG. 3 illustrates by a schematic perspective view the principle of a phonograph pickup with a movable Hall plate.

The pickup shown in FIG. 3 is provided with a stylus pin 31 to which a Hall plate 32 is fastened. The pin 31 is mounted at 33 to the tone arm of a record player. The lower end of the pin, preferably formed of a sapphire or other stylus member 34, oscillates in the direction of the double-headed arrow 35 in response to a grooved sound record. The Hall plate 32 performs corresponding deflections parallel to that direction between the preferably strongly tapering pole shoes of a permanent magnet or electromagnet 36, 37.

As mentioned, the necessity for flexible leads is avoided by a stationary mounting of the Hall plate and providing for movability of the magnetic system or part thereof. Thus, the Hall plate can be mounted in the gap of a magnetic system which has pole shoes adjacent to a permanent magnet, the magnet being oscillatingly mounted, for example by connecting it with the diaphragm of the microphone or the stylus of a pickup. Such a permanent magnet may also be formed by the diaphragm or the stylus pin itself, or by a magnetized coating placed upon the diaphragm or the stylus pin in the manner known from the magnetic coating of record tapes.

According to a further feature of the invention, relating to the type of transducer just mentioned, the movable permanent magnet is so magnetically oriented that only one of its two poles is located in front of the semiconducting Hall plate, thus providing for the desired inhomogeneity of the magnetic field. The Hall plate, forming a thin wafer or layer between two soft-magnetic plates of iron or ferrite, is preferably so located in the gap between the two plates as to be directly adjacent to the movable magnet.

The just-mentioned features will be further understood from the embodiments described presently with reference to FIGS. 4 to 7.

Figure 4:
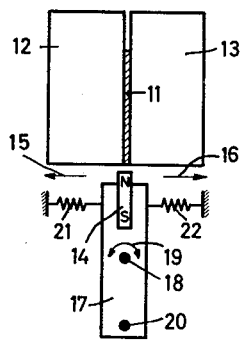
FIG. 4 is a top view of another phonograph pickup with a stationary Hall plate.

In the embodiment of a phonograph pickup shown in FIG. 4, the semiconducting Hall plate 11 is embedded in a narrow gap between two plates 12 and 13 of ferrite which afford a considerable increase in sensitivity. If the semiconductor plate does not cover the entire length of the gap, it is preferably so arranged that it is as closely adjacent as possible to the movable magnet 14 and hence reaches up to the lower edges of the plates 12 and 13 as shown. By using particularly thin semiconductor wafers or coatings, the gap between the two soft magnetic pieces 12 and 13 can be made extremely narrow. For this purpose, the semiconductor is preferably formed as a coating or layer deposited upon one of the pieces 12, 13 by vaporization, so that the effective gap width is a few microns or less.

The permanent magnet 14 is movable in the directions indicated by arrows 15 and 16. The direction of motion is perpendicular to the plane of the Hall plate. The magnet 14 is a straight bar with end poles which are denoted by N and S respectively. One of these two poles is located opposite the Hall plate 11. The magnet 14 is mounted on a lever 17 which, in the illustrated embodiment, is rotatable about a pivot 18, as indicated by an arcuate arrow 19. A stylus 20 of sapphire, ruby, diamond or the like is mounted on lever 17 for imparting rotary motion thereto. Two return springs 21, 22 serve for defining an accurate zero position in which the pole N is located symmetrically to Hall plate 11.

Figure 5:
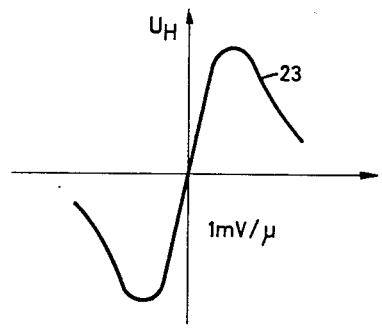
FIG. 5 is an explanatory graph relating to transducers according to the invention.

The graph of FIG. 5 represents a typical characteristic of the Hall voltage versus the deflection of a magnet 14. Such a device affords obtaining a sensitivity of a few millivolts per micron deflection. As a rule, only the essentially linear portion of the voltage curve 23 on both sides of the zero point is utilized for transducing purposes.

Figure 6:
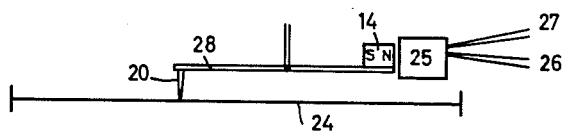
FIG. 6 illustrates another microphone.

In the microphone schematically shown in FIG. 6, the sonic oscillations are received by a diaphragm 24 and are transmitted through a lever 28 to a permanent magnet 14. The lever 28 is pivoted at 28a and is in contact with diaphragm 24 through a pin 20. The device thus operates in substantially the same manner as explained with reference to FIG. 4. The Hall plate together with two ferrite plates as shown in FIG. 4 are combined into a single structural unit 25 which is stationarily mounted and is provided with two current-supply leads 26 and with two output leads 27 for passing the generated Hall voltage to the amplifier as described above with reference to FIG. 8.

Figure 7:
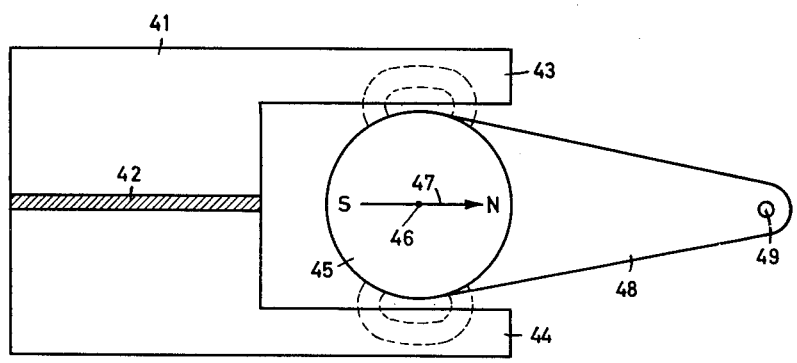
FIG. 7 is a top view onto another phonograph pickup with a stationary Hall plate.

As exemplified by FIG. 7, the movable permanent magnet may be located rotatably between the limbs of a magnet system which includes one or more Hall voltage generators. It is preferable to give the permanent magnet an essentially cylindrical shape or to provide it with cylindrical surface portions at the locations adjacent to the limbs.

It is further of advantage to give the permanent magnet a magnetic orientation at a right angle to its longitudinal cylinder axis. Depending upon the mechanical vibrations or other mechanical movements that are to be translated into electric magnitudes, a rotating or pivotal motion is imparted to the permanent magnet. It is of advantage in such cases to orient the magnetization of the permanent magnet so that when the magnet is in its position of rest, a symmetrical magnetic flux passes from the magnet through the respective two limbs of the magnet system. The gap of the system in which the Hall plate or plates are located is preferably arranged in symmetry and centrically between the two limbs.

The just mentioned features are embodied in the device shown in FIG. 7. The device comprises a magnetic system 41 formed of ferrite or other soft-magnetic material. The system has a gap in which a Hall plate 42 is located. A permanent magnet 45 is rotatably mounted between the limbs 43 and 44 of the magnet system. The longitudinal cylinder axis extends at point 46 perpendicularly through the plane of illustration. This axis is also the axis of rotation of the magnet. In the illustrated embodiment, the permanent magnet is magnetized in the direction of the arrow 47 which is at a right angle to the cylinder axis. The locations of the magnet poles are denoted by N and S respectively. A stylus 49 of sapphire or the like is firmly mounted on arm 48. The lateral deflection of the stylus 49, occurring when playing a grooved record, causes the permanent magnet 45 to perform rotational oscillations about its longitudinal axis. When the magnet thus turns out of its illustrated position of rest, the symmetry of the magnetic flux distribution, shown schematically by broken lines at F, is disturbed, and the magnetic flux path closes itself partially through the Hall plate 42. As a result, the plate generates a Hall voltage whose magnitude and direction depend upon the degree and direction of deflection.

Figure 9:
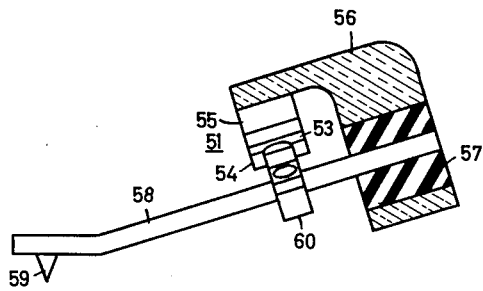
FIG. 9 is a partly sectional view of a stereophonic pickup with two stationary Hall plates, the section being taken along the vertical line denoted by IX—IX in FIG. 10.
Figure 10:
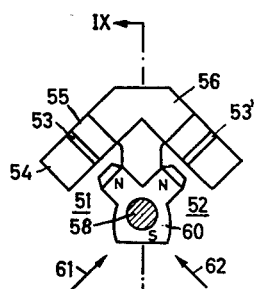
FIG. 10 is a part-sectional front view of the same stereophonic pickup.

As mentioned, a transducer according to the invention may be designed as a pickup for stereophonic recordings. An embodiment of this type is shown in FIGS. 9, 10 and 11.

The pickup comprises two magnet systems denoted as a whole by 51 and 52 respectively. The system 51 has a Hall plate 53 located between two yoke pieces 54 and 55 of ferrite as described above with reference to FIG. 4. One pole N of a permanent magnet is located opposite the Hall plate 53. A second system 52 is designed in the same manner as the system 51 and operates with another pole N of the permanent magnet. It will be understood that instead of using a single permanent magnet with two poles of the same polarity, two separate magnets may be used. The two systems 51 and 52 are firmly secured to a carrier 56 of insulating, preferably synthetic, material. The same carrier has an opening in which a bushing of rubber 57 is seated to serve as a universal pivot for a stylus pin 58 carrying the stylus proper 59. This pickup is particularly designed for playing stereophonic recordings of the lateral 45° type. When the stylus is deflected by one of the twin sound tracks in the direction of the arrow 61 (FIG. 10), the deflection has minimum effect upon the magnetic system 52 and maximum effect upon the system 51. When the stylus is deflected by the other track in the direction of the arrow 62, the deflection has minimum effect upon the system 51 and maximum effect upon the system 52. The pickup therefore is suitable for reproducing two recording channels at the same time.

Figure 11:
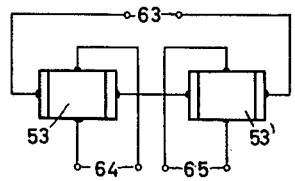
FIG. 11 is a schematic circuit diagram relating to FIGS. 9 and 10.

One way of connecting the pickup with the amplifying circuit is illustrated in FIG. 11. The two Hall plates 53 and 53' are connected at terminals 63 to a source of constant energizing current, for example direct current or, as explained above, to a source of alternating current whose frequency is beyond the audible range. The two Hall plates generate separate output voltages at terminal pairs 64 and 65 respectively. These two voltages are supplied to separate amplifiers to be acoustically reproduced in separate loudspeakers.

It will be obvious to those skilled in the art upon a study of this disclosure that my invetnion permits of various modifications and may be embodied in devices other than particularly illustrated and described herein, without departing from the essence of my invention and within the scope of the claims annexed hereto.

I claim:

1. An electroacoustic transducer for translating mechanical oscillation into voltage, comprising a permanent magnet oscillatingly mounted for motion in response to oscillations to be translated, Hall-voltage generating means having at least one Hall plate stationarily mounted in an inhomogeneous field portion of said magnet, two current supply terminals at opposite ends of the plate as well as two Hall-voltage output electrodes between said terminals at opposite edges of said plate, a Hall-plate energizing circuit connected to said terminals to supply current thereto, and two magnetizable structures stationarily mounted with respect to said magnet and spaced from each other to form a gap, said movable magnet having magnetic poles oriented in the plane of said Hall plate in one of its positions during its oscillations, one of the poles of said magnet being closer to said Hall plate than the other of said poles, said Hall plate being immovably mounted in and gap in face-to-face relation to said structures.

2. An electroacoustic transducer for translating mechanical oscillation into voltage, comprising a permanent magnet oscillatingly mounted for motion in response to oscillations to be translated, Hall-voltage generating means having at least one Hall plate stationarily mounted in an inhomogeneous field portion of said magnet, two current supply terminals at opposite ends of the plate as well as two Hall-voltage output electrodes between said terminals at opposite edges of said plate, a Hall-plate energizing circuit connected to said terminals to supply current thereto, and two magnetizable structures stationarily mounted with respect to said magnet and spaced from each other to form a gap, said movable magnet having two poles one of which is located at one side of said gap and the other away from the gap, said Hall plate being predominantly located in the portion of said gap directly adjacent to the magnet, said Hall plate being immovably mounted in said gap in face-to-face relation to said structures.

3. Electroacoustic transducer for translating sonic oscillation into voltage, comprising a substantially U-shaped, magnetizable yoke structure having two parallel limbs and having a planar gap extending in the bight portion of the U-shape and parallel to said limbs, Hall-voltage generating Hall plate means disposed in said gap and two current supply terminals at opposite ends of the plate as well as two Hall voltage output electrodes intermediate said terminals at opposite edges of said plate, a Hall energizing circuit connected to said terminals to supply current thereto, a permanent magnet rotatably mounted between said two limbs, and an oscillatory member responsive to the oscillations to be translated and joined with said magnet for imparting oscillatory rotation thereto.

4. In a transducer according to claim 3, said gap extending in the center of the bight portion of said yoke structure in symmetrical relation to said two limbs.

5. In a transducer according to claim 3, said magnet having a cylindrical portion located between said two limbs with the cylinder axis extending at a right angle to the direction of mutual spacing of said two limbs and coinciding with the axis of rotation.

6. In a transducer according to claim 5, said magnet being polarized in a direction perpendicular to said cylinder axis.

7. In a transducer according to claim 6, said magnet having biasing means tending to hold it in a given position of rest relative to said limbs, and said magnet having a magnetization so oriented that the magnetic fluxes through said two limbs are symmetrical in said given position of rest.

References Cited in the file of this patent

UNITED STATES PATENTS

| | | |
|---|---|---|
| 543,843 | Biggar | Aug. 16, 1895 |
| 1,794,376 | Hartsough | Mar. 3, 1931 |
| 2,536,805 | Hansen | Jan. 2, 1951 |
| 2,536,806 | Hansen | Jan. 2, 1951 |
| 2,866,857 | Andrews | Dec. 30, 1958 |
| 2,907,834 | Duinker | Oct. 6, 1959 |

FOREIGN PATENTS

| | | |
|---|---|---|
| 1,020,680 | Germany | Dec. 12, 1957 |